United States Patent [19]

Eckberg

[11] Patent Number: 4,525,391
[45] Date of Patent: Jun. 25, 1985

[54] VINYL GUM CURE ACCELERATORS FOR CONDENSATION-CURE SILICONE

[75] Inventor: Richard P. Eckberg, Roundlake, N.Y.

[73] Assignee: General Electric Company, Waterford, N.Y.

[21] Appl. No.: 602,218

[22] Filed: Apr. 19, 1984

Related U.S. Application Data

[63] Continuation of Ser. No. 359,480, Mar. 18, 1982, abandoned.

[51] Int. Cl.³ ............................................. B05D 3/02
[52] U.S. Cl. ..................................... 427/391; 156/344; 427/387; 428/447; 428/452; 525/478; 525/479; 528/15
[58] Field of Search ............... 427/387, 391; 525/478, 525/477, 479; 528/15; 156/344; 428/447

[56] References Cited

U.S. PATENT DOCUMENTS

| | | | |
|---|---|---|---|
| 3,159,601 | 12/1964 | Ashby | 260/46.5 |
| 3,220,972 | 11/1965 | Lamoreaux | 260/46.5 |
| 3,814,730 | 6/1974 | Karstedt | 260/46.5 |
| 3,867,343 | 2/1975 | Garden | 260/46.5 |
| 3,922,443 | 11/1975 | Brown et al. | 428/447 |
| 4,026,835 | 5/1977 | Lee et al. | 260/2.5 |
| 4,256,870 | 3/1981 | Eckberg | 528/15 |
| 4,262,107 | 4/1981 | Eckberg | 528/15 |
| 4,273,902 | 6/1981 | Tomioka et al. | 528/15 |
| 4,311,821 | 1/1982 | Weitemeyer et al. | 528/15 |
| 4,340,647 | 7/1982 | Eckberg | 428/429 |

*Primary Examiner*—Thurman K. Page

[57] ABSTRACT

There are provided condensation curable silicone release compositions comprised of a silanol functional base polymer, a crosslinker containing silanic hydrogen, a precious metal catalyst such as platinum or rhodium, an optional carboxylic ester inhibitor and silicone vinyl gum cure accelerators effective for allowing thermal cure at relatively lower temperatures while minimizing the necessity of excess metal catalyst.

20 Claims, No Drawings

VINYL GUM CURE ACCELERATORS FOR CONDENSATION-CURE SILICONE

This is a continuation of U.S. application Ser. No. 359,480 filed Mar. 18, 1982, abandoned.

BACKGROUND OF THE INVENTION

The present invention relates to condensation cured polysiloxane compositions containing vinyl gum cure accelerators which are particularly well suited for coating applications and are especially useful as paper release coatings.

Silicone compositions have long been used as release coatings, which are useful in many applications whenever it is necessary to provide a surface or material which is relatively nonadherent to other materials which would normally adhere thereto. Silicone release compositions are widely used as coatings which release pressure-sensitive adhesives for labels, decorative laminates, transfer tapes, etc. Silicone release coatings on paper, polyethylene, Mylar, and other such substrates are also useful to provide non-stick surfaces for food handling and industrial packaging applications. For example, when self-adhesive labels are mounted on paper backing, it is desirable that the paper backing be easily peeled away from the label when it is ready for use. At the same time, the adhesive quality of the label should not be reduced by its having been peeled away from the backing. The same principle applies to various adhesive tapes which are wound on spools: The tape must unroll easily and still maintain its adhesive quality. Silicone release compositions coated on the surface of the label mounting paper, or the nonadhesive side of the tape, will prevent, respectively, permanent adhesion of the label to the mounting paper, or adhesion of the tape to the nonadhesive side of the tape as it is rolled.

Silicone compositions previously developed as release coatings have had to be dispersed in solvent in order to control the coatings' viscosity and thereby aid their application to substrates. Use of solvents, however, entails the highly inefficient process step of evaporating the solvent, which requires large expenditures of energy and costly pollution controls.

Because of these drawbacks, there has been a growing need for solventless coating compositions which are easy to apply to substrates. Such solventless coating compositions are sometimes referred to as "100% solids" compositions. The absence of solvent lowers the amount of energy required to cure such compositions and eliminates the need for expensive pollution abatement equipment.

Previously developed solventless polysiloxane release coatings, however, still require high oven cure temperatures in the neighborhood of 300° F. minimum and are more expensive to use than solvent-dispersed or emulsion compositions. The high cure temperature requirement limits the usefulness of such coatings because only high-density papers or high melting point plastics and the like can be used as substrates without charring, melting or otherwise degrading during cure.

The higher cost of using solventless silicone release compositions stems from the nature of the curing reaction:

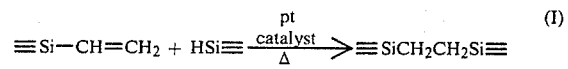

Linear substituted polysiloxane polymers, which are the main component in solventless silicone release compositions, undergo this hydrosilation addition reaction during cure. Effective migration-free cure is obtained when $\equiv$Si—CH=CH$_2$ content is no less than 3 or 4 mole percent of the polysiloxane polymer. Such vinyl substitution to set up the addition reaction shown at (I) is very expensive; and vinyl substitution paired with use of expensive platinum addition-cure catalysts is responsible for the high cost of using solventless grades.

U.S. Pat. No. 4,256,870 to Eckberg (incorporated herein by reference) discloses silicone release compositions which can be cured at temperatures as low as 200° F.; however, to effect an acceptable cure at these reduced temperatures, a large amount of platinum catalyst is required. For example, as much as eight times the amount of platinum (e.g., 200 ppm instead of 25 ppm) might be necessary for low temperature cure compared to that required for high temperature cure. Obviously, the high platinum concentration adds to the cost of such compositions, and there is consequently considerable current interest in limiting the level of required platinum without sacrificing low temperature cure performance.

Copending U.S. application Ser. No. 267,091, now U.S. 4,340,647 (incorporated herein by reference) discloses that certain vinyl functional siloxane gums will act as cure accelerators in reactions such as (I), above, allowing lower temperature cure at lower levels of platinum than would be required in the absence of the vinyl gums.

It is known that silanol-stopped polymers will crosslink with HSi$\equiv$compounds via condensation reactions:

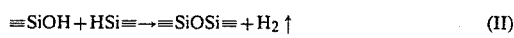

Organotin compounds may be used to catalyze this reaction in standard solvent dispersion grades, but platinum-metal group complexes are also catalytically active and have been used in silanol-based release coatings. See U.S. Pat. No. 4,026,835 (Lee et al.), U.S. Pat. Nos. 3,867,343 (Garden), 3,922,443 (Brown et al.), and 4,262,107 (Eckberg).

It has now been surprisingly discovered that vinyl-functional linear siloxane gums act as cure accelerators for platinum-catalyzed silanol-based condensation cure solventless paper release compositions. Such release compositions have the combined advantages of reduced cure temperature and reduced cost from eliminating vinyl substitution expenses and reducing platinum usage.

Accordingly, a primary objective of the present invention is to provide a solventless composition which will render surfaces nonadherent to materials which would normally adhere thereto.

Another object of the present invention is to provide a solventless coating composition which will cure at relatively low temperatures.

Another object of the present invention is to provide a silanol-based solventless release coating composition which requires relatively low levels of curing catalyst.

Another object of the present invention is to provide a solventless coating composition utilizing novel vinyl siloxane gum cure accelerators.

Another object of the present invention is to provide a method of rendering materials nonadherent to other materials which would normally adhere thereto.

Another object is to provide articles of manufacture having nonadherent surfaces by coating the articles with the release compositions of the present invention.

Another object of the present invention is to provide a solventless silicone composition which is particularly well suited for paper release applications.

SUMMARY OF THE INVENTION

These and other objects are accomplished herein by a silicone release coating composition comprising a base polymer such as a silanol-stopped polydialkyl polysiloxane base copolymer and a methylhydrogen crosslinking fluid. This composition is catalyzed by platinum or a platinum complex which will initiate a condensation cure reaction. Ordinarily the crosslinking compound is added at the time of use to other ingredients. Generally, any silicone base polymer having silanol functionality will lend itself to a precious metal-catalyzed condensation cure reaction of the present invention. An inhibitor such as diallylmaleate or dimethylmaleate can be added to the composition in order to selectively retard the cure reaction so as to provide adequate shelf-life and workable pot-life for the coating composition. There is also added a dimethylvinyl chainstopped polydimethylmethylvinylsiloxane polymer gum which will accelerate the condensation cure reaction at relatively low temperature without sacrificing performance. It is believed that excesses of platinum catalyst can be avoided because the vinyl gum raises the efficiency of the crosslinking reaction, thereby reducing the required amount of catalyst for a given temperature, cure time and polymer. In a sense the highly polymerized gum reduces the amount of crosslinking required of the catalyst and facilitates a reduction in amount of catalyst at a given temperature. This vinyl gum will ordinarily be contained in the crosslinkable polymer base along with the catalyst and optional inhibitor. Addition of the crosslinking agent at the time of use provides the coating composition.

DESCRIPTION OF THE PREFERRED EMBODIMENTS

The present invention provides silicone release coating compositions which may be utilized in solventless form. The curable compositions will ordinarily be comprised of a mixture of several ingredients which can be coated on a substrate, such as paper, and when cured thereon will form a coating which is relatively nonadherent towards materials which would normally adhere thereto, such as organic adhesives. The coating compositions may be provided in a solvent dispersion where 100% solids compositions are not required.

The major ingredient in such a composition will ordinarily be a diorganopolysiloxane base polymer which will preferably have up to approximately 20% by weight of silanol functional groups and a viscosity of, approximately, 25 to 1,000 centipoise at 25° C. The preferred organic group for such polymers is methyl.

The second major ingredient in the release composition is a polymethylhydrogen siloxane fluid crosslinking agent, having up to, approximately, 100% by weight SiH-containing groups and a viscosity of, approximately, 25 to 1,000 centipoise at 25° C.

The base polymer and crosslinker are catalyzed by an effective amount of precious metal catalyst for facilitating well-known condensation cure reaction between these materials. Particularly preferred catalysts will be complexes of platinum and rhodium which will be described below. Those skilled in the art will be able to vary the amount of catalyst to affect the rate of cure. For example, as taught in U.S. Pat. No. 4,256,870, satisfactory cure can be obtained at approximately 300° F. by utilizing approximately 25 ppm platinum metal. As will be seen, the present invention allows satisfactory cure at as low as 200° F. without requiring excessive amounts of platinum catalyst. Of course, thermal cures of 500° F. or more could still be utilized as long as the substrate does not deform.

To prevent premature gellation of the present compositions, U.S. Pat. No. 4,256,870 teaches that a dialkyl maleic acid ester will effectively inhibit the cure reaction until thermal cure is desired. Suitable inhibitors include dimethylmaleate, and diallylmaleate. Of course, the amount needed will vary according to the amount of catalyst which must be inhibited. It is to be noted that such inhibitors are not essential in a solvent based system but may be used if desired.

The silicone compositions of the present invention also contain a so-called vinyl gum accelerator which facilitates or enhances the rate of cure at as little as 200° F. such that satisfactory cure times can be obtained with reduced amounts of catalyst.

Heretofore, if satisfactory cure time was required at, for example, 200° F., the coating composition would require at least 200 ppm platinum or rhodium catalyst (generally in the form of a silicone-soluble complex) which in turn requires at least 1.25 weight percent dimethylmaleate (DMM) or other inhibitor to effectively inhibit cure at ambient conditions. By utilizing an effective amount of the vinyl gum accelerator according to the present invention, the same satisfactory cure could be obtained with only 150 ppm platinum and 0.9 weight percent DMM. This represents a 25% reduction in the amount of platinum required in this example, which would lead to significant cost savings.

As little as 0.5 weight percent of the vinyl gum will exhibit some effect, and ordinarily up to 10 weight percent, based upon the total weight of the base polymer, will be used. Greater than 10 weight percent of the vinyl gum can also be used, but since it is quite viscous it is relatively more difficult to get it into solution in the silicone base polymer, especially for solventless coating applications.

The particularly preferred vinyl gums for use as cure accelerators in the present invention are essentially linear dimethylvinyl-chainstopped polydimethylmethylvinylsiloxane polymers having an average molecular weight of, approximately, 200,000 to 400,000. This material can be obtained by well known means by using appropriate amounts of dimethylvinylsilyl chainstoppers, methyltetramer and methylvinyl tetramer. Such polymers can also have from 0 to 5 mole percent methylvinylsiloxy content, but vinyl in the chain does not have the same effect as does the vinyl chainstopper in such gums.

The release compositions of the present invention is particularly well suited for rendering materials nonadherent to other normally adherent materials such as glue and adhesives. Additionally, the compositions can be applied directly to a substrate without the need for a solvent, thus avoiding all of the problems associated with coating solvents described above.

A typical composition of this invention is a polysiloxane made up of several ingredients which will thermally cure on the substrate upon which it is coated, and render the substrate nonadherent. A major proportion of the composition is a silanol chainstopped polysiloxane having the formula:

$$HO-(SiRR'O)_x-H$$

where R and R' are the same or different monovalent hydrocarbon radicals free of aliphatic unsaturation, such as methyl, ethyl, propyl, butyl and the like. x is a positive integer such that the silanol-stopped polysiloxane has a molecular weight of approximately 2000 to 20,000. The viscosity of such polysiloxanes ranges from approximately 25 to 1000 centipoise at 25° C. The preferred silanol-stopped polysiloxane is a silanol-stopped linear polydimethyl siloxane fluid having a viscosity of 300 to 1000 cps.

Methylhydrogen fluid is often used by those skilled in the silicone art as a crosslinking agent for curable silicone systems. Particularly useful as a crosslinking agent for the present invention is a trimethyl-chainstopped polymethylhydrogen siloxane fluid having from approximately 10% to approximately 100% SiH-containing siloxy groups and having a viscosity in the range of approximately 25 to approximately 1,000 centipoise at 25° C.

The curing reaction which takes place between the silanol-functional polysiloxane and the polymethylhydrogensiloxane fluid crosslinking agent is a condensation cure reaction. The composition of the present invention may be thermally cured by means of a platinum metal-catalyzed crosslinking reaction between the pendant hydroxyl groups of a silanol-chainstopped polydialkyl-siloxane polymer and the H-Si groups of a trimethyl chainstopped polymethylhydrogen fluid.

A useful catalyst for facilitating the condensation curing reaction is the Lamoreaux catalyst as described in U.S. Pat. No. 3,220,972 issued Nov. 30, 1965, and assigned to the same assignee as the present invention. Others are the catalysts proposed by Ashby in U.S. Pat. No. 3,159,601; and Karstedt in U.S. Pat. No. 3,814,730. Other Group VIII-metal catalysts can also be utilized in practicing the present invention and their selection depends upon such factors as speed of the reaction required as well as expense, useful shelf-life, useful pot-life and the temperature at which the cure reaction is to take place. Such precious-metal catalyst include those which utilize the metals ruthenium, rhodium, palladium, osmium, iridium and platinum, and complexes of these metals. In U.S. Pat. No. 4,262,107 the present inventor proposed several rhodium catalysts useful in silicone rubber compositions. It is believed that these catalysts should also be useful in the condensation cure release composition of the present invention. All of the above-mentioned patents are hereby incorporated by reference. For coating compositions as described above, the amount of catalyst ranges from approximately 10 to approximately 500 ppm of metal, again depending upon the factors of speed of reaction and cost. Preferably, the amount of catalyst is approximately 10 to 50 ppm of precious metal.

In order that those skilled in the art may better practice the present invention, the following examples are provided by way of illustration, and not by way of limitation.

EXAMPLES 1-5

Five experimental paper release compositions were prepared as follows:

COMPOSITION 1

100 parts of a silanol-stopped linear polydimethylsiloxane fluid (General Electric SPBD grade 81943, 540 cps viscosity) were mixed with 5 parts of a 30 cps viscosity silanol fluid (General Electric SPBD grade 88017) and 5 parts of a vinyl-functional linear gum (General Electric grade 81854 vinyl gum, penetration equals 5220) at 150° C. until the gum was thoroughly dispersed in the fluids. The mixture was cooled to below 70° C., and sufficient platinum catalyst (chloroplatinic acid complexed with methylvinylcyclotetrasiloxane) was added to furnish 100 ppm platinum metal. 0.4 parts of dimethylmaleate inhibitor (DMM) were added, and the complete mixture stirred until uniform. A 1100 cps viscosity fluid product was obtained.

COMPOSITION 2

100 parts of a 170 cps silanol-stopped dimethylsilicone fluid were mixed with 5 parts of the vinyl gum and blended together with sufficient catalyst to provide a 50 ppm platinum with 0.2 parts DMM. A 470 cps fluid product was obtained.

COMPOSITION 3

100 parts of a 170 cps silanol fluid and 5 parts of the vinyl gum were blended with sufficient catalyst to provide 100 ppm platinum and 0.4 parts DMM. A 470 cps fluid product was obtained.

COMPOSITION 4

100 parts of a 75 cps silanol fluid and 5 parts of the vinyl gum were blended together with sufficient catalyst to provide 100 ppm platinum and 0.4 parts DMM. A 225 cps fluid product was obtained.

CONTROL

A composition was prepared identically to composition 1 in every respect except that no vinyl gum was provided.

To test the cure performance of these compositions, coating baths were prepared by mixing 10 parts of the solventless mixtures with 0.5 parts of a polymethylhydrogensiloxane crosslinking agent (General Electric SS-4300c). The coating bath solution was applied to 40 pounds super calendered Kraft paper with a doctor blade and the silicone coating was cured to a smear- and migration-free abhesive surface in a forced-air oven. The minimum oven dwell time required for cure as a function of temperature is the measure of cure performance for a particular experimental composition. The following results were observed:

| Composition | 200° F. Cure, sec. | 250° F. Cure, sec. |
|---|---|---|
| 1 | 30 | 15 |
| 2 | 40 | 25 |
| 3 | 25 | 10 |
| 4 | 30 | 15 |
| control | 50 | 30 |

From these data it is readily seen that those compositions including the vinyl gum are cured to good release coatings significantly faster, particularly at lower temperatures, than the control material which did not contain this gum. This is true even for compositions containing half the platinum catalyst present in the control.

It was also observed that although these new materials are highly reactive at oven temperature, the room-temperature pot-life of the coatings is quite adequate. The viscosity of the coating bath prepared using composition 1 increased only approximately 20% after 72 hours at room-temperature, demonstrating that the DMM inhibitor successfully prevented rapid gellation of this system.

Obviously, other modifications and variations of the present invention are possible in the light of the above teachings. It is to be understood, however, that any changes which may be made in the particular embodiments described above are within the full intended scope of the invention as defined in the appended claims.

I claim:

1. A silicone release coating composition comprising:
    A. A solventless condensation curable composition comprised of:
        (i) a silanol-chainstopped linear diorganopolysiloxane base polymer having the formula, HO—(SiRR'O)$_x$—H, where R and R' are the same or different monovalent hydrocarbon radicals free of aliphatic unsaturation, x is a positive integer such that said base polymer has a molecular weight of approximately 2000 to 20,000 and a viscosity of from 25 to 1000 centipoise at 25° C.;
        (ii) a polymethylhydrogen siloxane fluid crosslinking agent having up to approximately 100 weight percent SiH-containing siloxy groups and having a viscosity in the range of approximately 25 to approximately 1000 centipoise at 25° C.;
        (iii) an effective amount of precious metal catalyst for facilitating a condensation cure reaction between said base polymer and said crosslinking agent at temperatures between, approximately, 90° C. to 300° C.; and
    B. an amount of dimethylvinyl-chainstopped polydimethylmethylvinylsiloxane polymer gum effective for accelerating the cure of said condensation curable composition wherein said gum has an average molecular weight of, approximately, 200,000 to 400,000.

2. A composition as defined in claim 1 wherein said condensation curable composition further contains an additional component (iv):
    (iv) an amount of dialkyl maleic acid ester containing carbon-to-carbon unsaturation effective to inhibit the precious metalcatalyzed condensation cure reaction of said silicone composition at temperatures below the heat cure temperature of said silicone composition.

3. A composition as defined in claim 2 wherein said gum is present in an amount of at least 0.5 weight percent of said condensation composition.

4. A composition as defined in claim 2 wherein said gum has a methyl-vinyl siloxy unit content of 0 to 5 mole percent of said gum.

5. A silicone release coating composition comprising:
    A. a solvent-based condensation curable composition comprised of:
        (i) a diorganopolysiloxane base polymer substantially free of aliphatic unsaturation, having silanol functional groups and having a viscosity ranging from approximately 25 to approximately 1000 centipoise at 25° C.;
        (ii) a polymethylhydrogen siloxane fluid crosslinking agent having up to approximately 100 weight percent SiH-containing siloxy groups and having a viscosity in the range of approximately 25 to approximately 1000 centipoise at 25° C.;
        (iii) an effective amount of precious metal catalyst for facilitating a condensation cure reaction between said base polymer and said crosslinking agent at temperatures between, approximately, 90° to 300° C.;
        (iv) an amount of hydrocarbon solvent effective for dispersing said condensation curable composition; and
    B. an amount of dimethylvinyl chainstopped polydimethylmethylvinylsiloxane polymer gum effective for accelerating the cure of said condensation curable composition wherein said gum has an average molecular weight of, approximately, 200,000 to 400,000.

6. A composition as in claim 5 wherein said gum is present in an amount of at least 0.5 weight percent of said condensation curable composition.

7. A composition as in claim 5 wherein said solvent is selected from the group consisting of hexane, toluene, naptha, xylene, and benzene and mixtures thereof.

8. A composition as in claim 5 wherein said gum has a methyl-vinyl siloxy content of 0 to 5 mole percent of said gum.

9. A composition as in claim 2 or 5 wherein said gum is present in an amount of, approximately, 5 to 10 weight percent of said condensation curable composition.

10. The cured product of claim 1, 2 or 5.

11. An article of manufacture comprising a paper substrate coated with the composition of claim 1, 2 or 5.

12. A method for rendering substrates relatively non-adherent to substances that would normally adhere thereto, comprising the steps of:
    A. combining
        (a) a diorganopolysiloxane base polymer substantially free of aliphatic unsaturation, having silanol functional groups and having a viscosity ranging from approximately 25 to approximately 1000 centipoise at 25° C.;
        (b) a polymethylhydrogen siloxane fluid crosslinking agent having up to approximately 100 weight percent SiH-containing siloxy groups and having a viscosity in the range of approximately 25 to approximately 1000 centipoise at 25° C.;
        (c) an effective amount of precious metal catalyst for facilitating a condensation cure reaction between said base polymer and said crosslinking agent at temperatures between, approximately, 90° to 300° C.; and
        (d) an amount of dimethylvinyl chainstopped polydimethylmethylvinylsiloxane polymer gum effective for accelerating the cure of a condensation curable composition wherein said gum has an average molecular weight of, approximately, 200,000 to 400,000 and a methyl-vinyl siloxy unit content of, approximately, 0 to 5.0 mole percent.

13. A method as in claim 12 further comprising the step of coating said composition upon a substrate.

14. A method as in claim 13 further comprising the step of curing said composition.

15. A method as in claim 13 wherein said substrate is paper.

16. A method as in claim 12 wherein said condensation curable composition is further comprised of an amount of dialkyl carboxylic ester containing carbon-to-carbon unsaturation effective to inhibit the precious metal-catalyzed hydrosilation cure reaction of said silicone composition at temperatures below the heat cure temperature of said silicone composition.

17. A method as in claim 12 wherein said condensation curable composition is dispersed in a solvent.

18. A method as in claim 12 wherein said gum is present in an amount of at least 0.5 weight percent of said condensation curable composition.

19. A product made by the method of claim 12.

20. A silicone composition capable of low temperature crosslinking to a nonadherent film when combined with a methyl hydrogen siloxy crosslinking fluid, comprised of:
(a) a diorganopolysiloxane base polymer substantially free of aliphatic unsaturation, having silanol functional groups and a viscosity of, approximately, 25 to 1000 centipoise at 25° C.;
(b) an effective amount of precious metal catalyst for facilitating a condensation cure reaction at temperatures between 90° and 300° C.;
(c) an amount of dialkyl maleic acid ester effective to inhibit said condensation cure reaction at temperatures below the heat cure temperature of said composition; and
(d) an amount of dimethylvinyl chainstopped polydimethylvinylsiloxane gum effective for accelerating the cure of said composition.

* * * * *